United States Patent Office.

ABNER WHITELEY, OF SPRINGFIELD, OHIO, ASSIGNOR TO WILLIAM N. WHITELEY, JR., OF THE SAME PLACE.

Letters Patent No. 75,229, dated March 3, 1868.

IMPROVEMENT IN HARVESTERS.

*The Schedule referred to in these Letters Patent and making part of the same.*

TO ALL WHOM IT MAY CONCERN:

Be it known that I, ABNER WHITELEY, of Springfield, in the county of Clark, and State of Ohio, invented a new and useful Improvement in Harvesters; and I do hereby declare the following to be a full, clear, and exact description of the same, reference being had to the accompanying drawings, in which—

Figure 1:
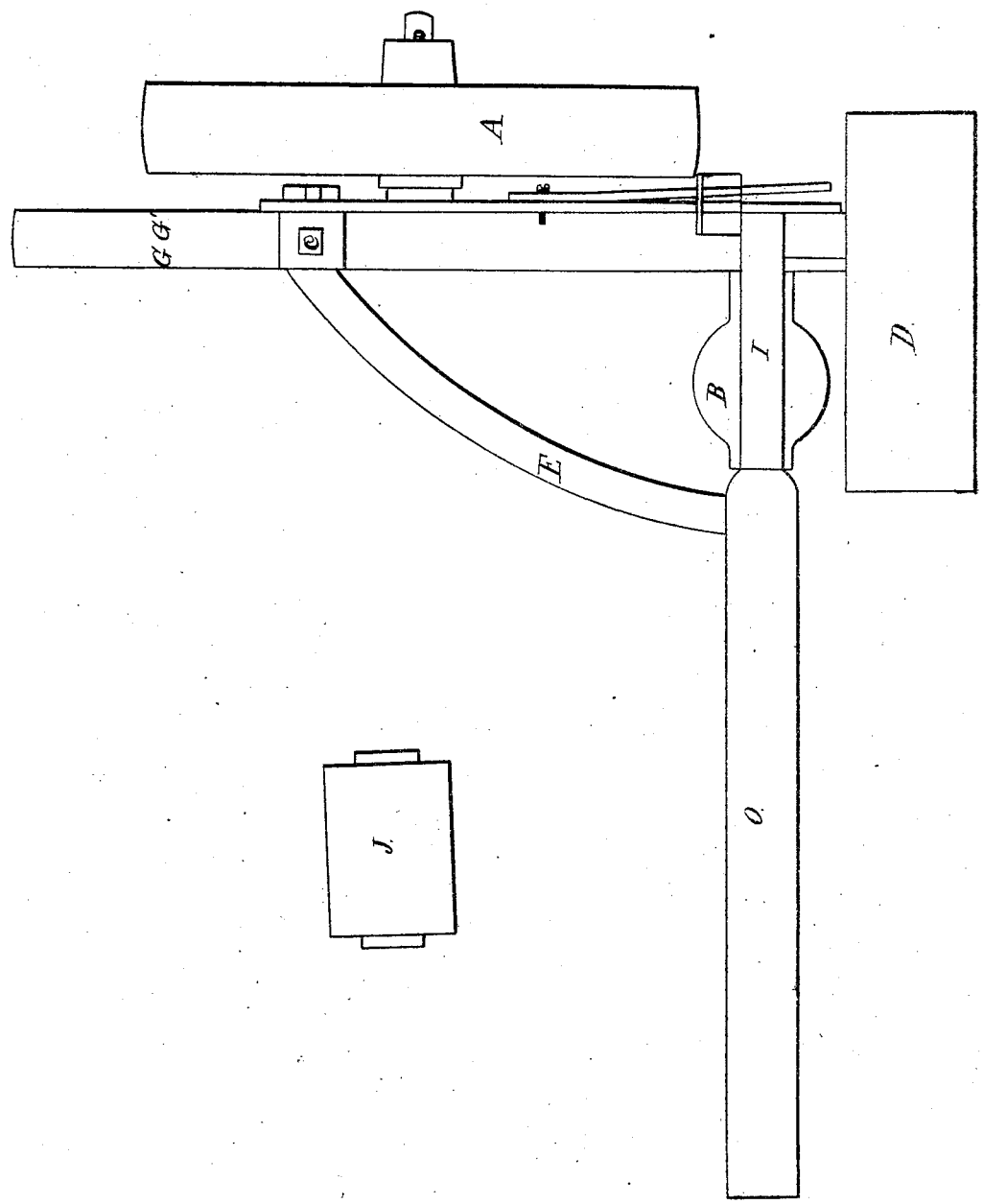
Figure 1 is a plan view of this machine.
Figure 2:
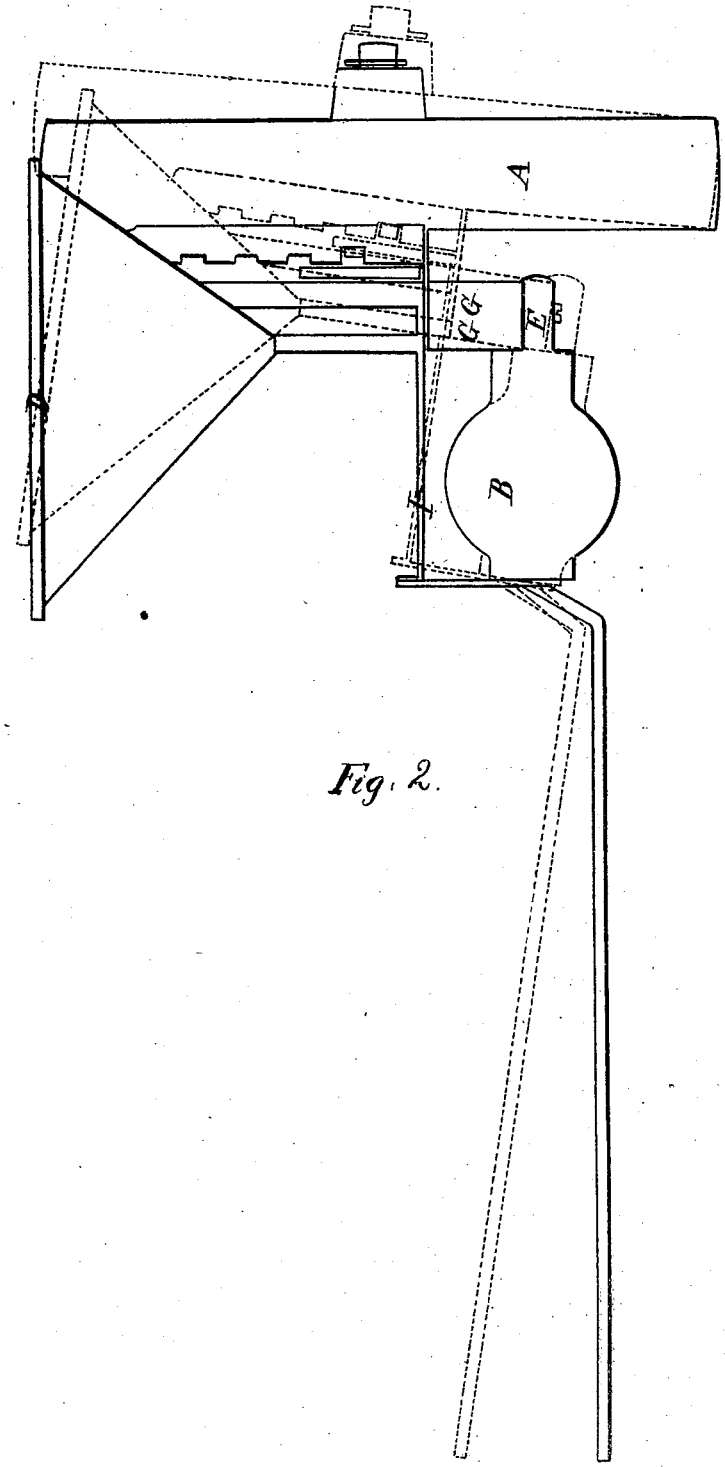
Figure 2 is a rear view, showing in black the position of the finger-bar, roller, driver's seat, &c., when the driver is sitting on that end of his seat nearest to the finger-bar, and in red lines the positions of the same parts when the driver is on that end of his seat farthest from the finger-bar.

This invention consists in constructing a harvesting-machine so as to enable the driver to use his seat as a lever, the lower peripheries of the ground-wheel and roller as fulcra, and his weight as the motive-power to raise or lower the finger-bar in respect to the ground, whether the machine be moving forward, backward, or standing still.

That others may understand the construction and operation of this machine, I will particularly describe it.

A is the main bearing and cutter's driving-wheel; B is the roller at the inner end of the cutter-bar C, which forms the other bearing of the machine upon the ground when the cutter-bar is elevated therefrom; D is the driver's seat; I is the driver's foot-rest; F is the arm which connects the finger-bar C to the main frame G G'; and E is the brace-rod, which connects the finger-bar to the forward part of the main frame. In this application the spherical roller B is placed on the arm F, which is an extension of the finger-bar C, but it is not necessarily so placed. It may be placed upon a separate axle, which may be attached to the finger-bar in some secure and convenient manner. The brace-rod or drag-bar E connects the inner end of the finger-bar to the front end of the main frame, so as to relieve the arm F and its connection with the main frame from the effects of side draught. The driver's foot-rest I is located just above the roller B, and the driver's seat D is mounted upon a standard elevated from the rear end of the main frame. This seat extends laterally on either side of the main frame, but extends farther on that side which is toward the finger-bar than on the other side. The wheel A and roller B form two bearings upon the ground, and a line which would connect their points of contact with the ground may be called the line of bearing. This line may be considered as forming the hypothenuse of a triangle, of which the line of the finger-bar, (also through the point of contact of the roller B,) may form the base, and a line at right angles to this latter, cutting the point of contact of the wheel A, may be the perpendicular. The seat D is parallel with the base-line above mentioned. Now it is evident that supposing the hypothenuse line is in contact with the ground, it may form an axis of motion, and in that sense the base and perpendicular lines will both form levers, and their angle of meeting will be the long arm of this lever. If a certain weight be placed in front of this axis of motion, a certain other weight placed behind the said axis may or may not overcome it, as it is farther from or nearer to the axis. The finger-bar and cutting-apparatus is a fixed weight in front of the axis above specified, and the driver upon his seat is a movable weight behind the same axis. If the driver's weight be sufficient, that end of the machine will be depressed, moving upon the hypothenuse line as an axis, and the finger-bar C will be elevated in a corresponding degree. The driver has it in his power at all times to place his weight at any point on his seat nearer to or farther from the axis upon which the machine moves, in raising or depressing the cutting-apparatus, and hence he may use his seat as a lever, and himself as the weight to raise or depress the cutting-apparatus at pleasure, and he may do this whether the machine is moving forward, backward, or is standing still.

In operation the roller B being situated about in line with the finger-bar, passes over undulations of the ground, rising and falling at the same time that the cutting-apparatus rises or falls, and therefore the cutting apparatus will work more satisfactorily than it could were this roller either in front of or behind the cutter-bar, as then they would be influenced by inequalities of the ground at different moments. In moving the machine from place to place, or in turning or backing it, or to clear obstructions, it is necessary to raise the cutting-apparatus from the ground, and this may be done at any time by moving the weight of the driver to the far end of his seat. The roller presses the cut grass down less than a sliding shoe would do, and it is therefore preferable on that account. The globular shape of the roller insures an equal surface contact with the ground, in whatever position the finger-bar may be, a result which could not be obtained with any ordinary form of wheel.

Having described this invention, what I claim as new, and desire to secure by Letters Patent, is—

1. The globular roller B, placed at the inner end of and in line with the finger-bar of a harvesting-machine, in combination with the bearing-wheel A, and the driver's seat D, arranged and operating substantially as described.

2. The globular roller B placed on the end of the finger-bar, in combination with said finger-bar, the main frame, brace-rod E, and driving-wheel A, as set forth and described.

ABNER WHITELEY.

Witnesses:
REUBEN MILLER,
JAMES S. GOODE.